United States Patent [19]
Palusis et al.

[11] Patent Number: 5,592,814
[45] Date of Patent: Jan. 14, 1997

[54] ATTACHING BRITTLE COMPOSITE STRUCTURES IN GAS TURBINE ENGINES FOR RESILIENTLY ACCOMMODATING THERMAL EXPANSION

[75] Inventors: Mark E. Palusis, Jupiter; Carlos G. Figueroa, Wellington; Daniel C. Friedberg, Juno Beach; Gary D. Jones, Jensen Beach; Gunther Eichhorn, Palm Beach Gardens, all of Fla.

[73] Assignee: United Technologies Corporation, Hartford, Conn.

[21] Appl. No.: 360,937

[22] Filed: Dec. 21, 1994

[51] Int. Cl.$^6$ ...................................................... F02C 7/20
[52] U.S. Cl. ............................ 60/271; 60/39.32; 60/753
[58] Field of Search .............................. 60/39.31, 39.32, 60/752, 753, 271, 264, 755, 756, 758; 403/28, 29, 30, 179; 416/241 B

[56] References Cited

U.S. PATENT DOCUMENTS

| | | | |
|---|---|---|---|
| 3,791,142 | 2/1974 | Caldarelli | 60/39.32 |
| 3,911,672 | 10/1975 | Irwin | 60/39.32 |
| 4,312,599 | 1/1982 | Darolia | 416/241 B |
| 4,422,300 | 12/1983 | Dierberger et al. | 60/753 |
| 4,447,966 | 5/1984 | Mollenkopf et al. | 403/28 |
| 4,490,083 | 12/1984 | Rebish | 411/338 |
| 4,800,718 | 1/1989 | Zimmerman | 60/264 |
| 4,834,569 | 5/1989 | Foote et al. | 403/2 |
| 4,863,329 | 9/1989 | Wilson | 411/339 |
| 5,069,034 | 12/1991 | Jourdain et al. | 60/752 |
| 5,134,842 | 8/1992 | Boyd | 60/39.32 |
| 5,285,632 | 2/1994 | Halila | 60/753 |

FOREIGN PATENT DOCUMENTS

| | | | |
|---|---|---|---|
| 3625056 | 1/1988 | Germany | 60/753 |
| 2087503 | 5/1982 | United Kingdom | 403/30 |

*Primary Examiner*—Timothy Thorpe
*Assistant Examiner*—Ted Kim
*Attorney, Agent, or Firm*—Robert E. Greenstien

[57] ABSTRACT

Two composite parts, such as sheet and a hollow gas turbine liner tile, are fastened together using a fastening system that includes a journal bearing that fits in a bore in the sheet and springs to support a bolt fastener that is tightened to hold the parts together. Resilient spacers are placed between the sheet and the liner. The springs may comprise a stack of rings, each ring being a tightly wound helical spring, giving the ring a hollow cross section and resilient qualities.

3 Claims, 3 Drawing Sheets

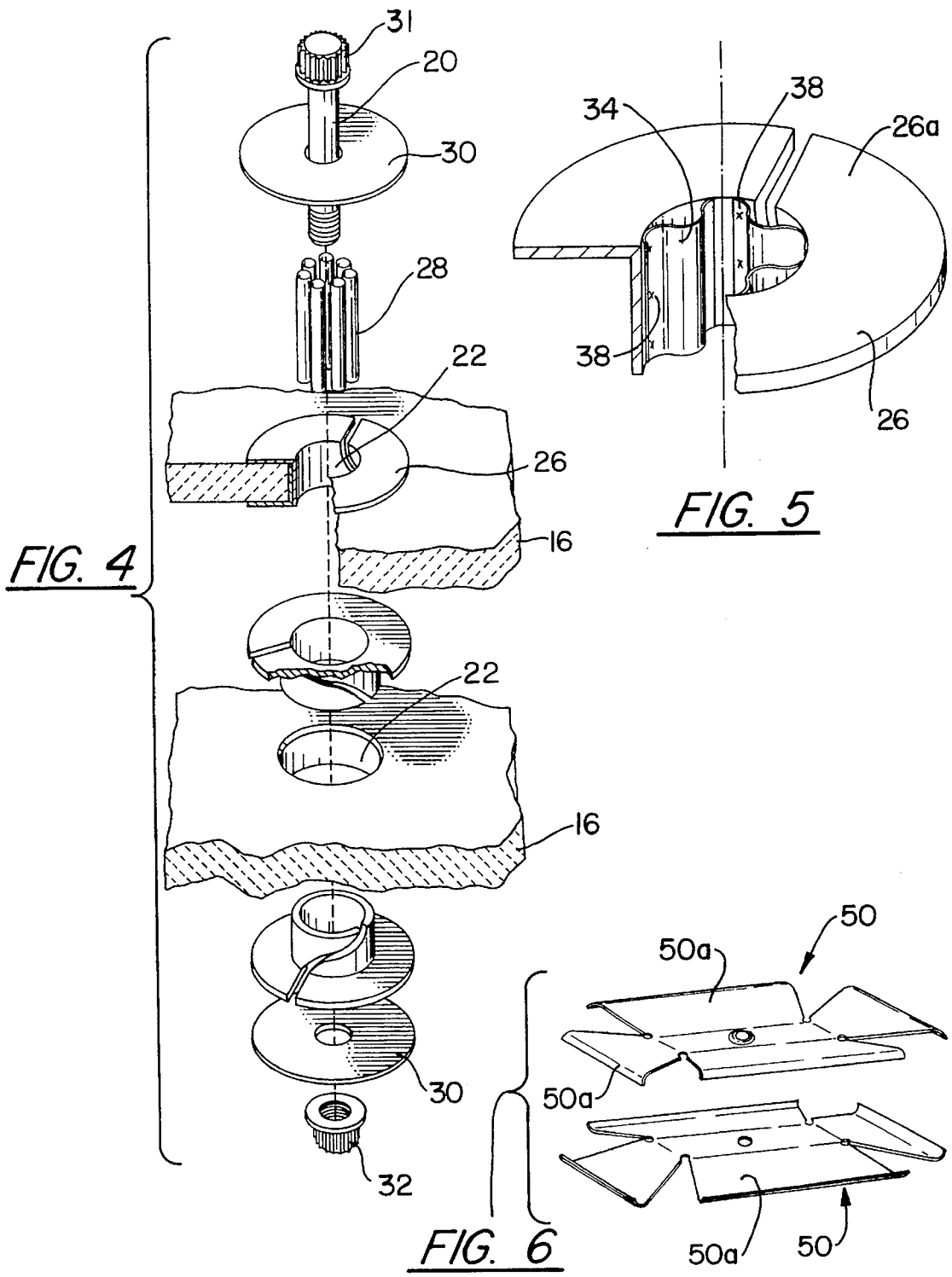

ATTACHING BRITTLE COMPOSITE STRUCTURES IN GAS TURBINE ENGINES FOR RESILIENTLY ACCOMMODATING THERMAL EXPANSION

This was made under a U.S. Government contract giving the Government rights herein.

TECHNICAL FIELD

This invention relates to techniques for attaching structures, in particular, brittle composite structures, such as ceramic sheets and exhaust liners in gas turbine engines.

BACKGROUND OF THE INVENTION

Composite parts and structures are finding ever wider use because of their high strength to weight ratio. Some composites are attractive because they also resist high temperatures. Gas turbine exhaust liners are one environment where these qualities are especially attractive. Ceramic components are especially attractive because they resist the extremely high gas turbine exhaust temperatures, although they do have significantly less strength than pure metal components. Ceramic composites such as Nextel 440/Silica display a rather brittle matrix structure, one that tends to powder when exposed to impact and point loads. That characteristic presents challenges when mounting ceramic matrix components, such as liners in an engine exhaust. A conventional bolt can create extremely high point loads, fracturing the ceramic surface. In other words, the surface can be damaged simply from the compression if a conventional screw bolt is used to fasten the ceramic in place. In addition, vibration produces mechanical loads that generate impact and point loads on the ceramic's surface. Similar loads, created from large differences in thermal expansion, can damage the ceramic. For instance, thermal radial growth by a bolt in a hole or bore in a composite structure can exert substantial forces, producing either or both a crack and bearing failure.

Some of these problems have been considered in other applications in the prior art. For instance, elastomeric bushings are used to reduce noise and vibration, but they are not resistant to high temperatures and do not provide firm support. Washers are used to distribute compression loading, but they can distort, creating high point loads. U.S. Pat. No. 4,834,569 shows a technique in which an insert or bushing is placed in a composite core. U.S. Pat. No. 4,490,083 shows a technique that uses a deformable insert to protect the interface between a fastener and the bore walls. U.S. Pat. No. 4,790,683 shows a method that employs a tolerance ring in conjunction with a relatively soft material to prevent damage (deformation) to the material. However, none of these techniques make a significant contribution towards protecting brittle ceramic composites from all of the forces created by a fastener placed in a high temperature, high vibration environment, such as if found in the exhaust of a gas turbine engine.

DISCLOSURE OF THE INVENTION

The objects of the present invention include providing a technique for firmly mounting a composite structure in a way that also optimally protects its surfaces from high point loads, stresses from thermal growth at the fastener bore and mechanical movement between the fastener and the structure.

According to the present invention, a fastening arrangement is provided by which a journal bearing is inserted into the bore in a composite. A bearing assembly is inserted into the bore and a fastener extends through the assembly. The assembly includes circular metallic, resilient springs (bearings with a radially damping effect) that allow axial and radial movement between the fastener and the seat.

According to the invention, the seat contains a flange with a circumferential land so that compression forces are applied to the composite at a radial distance away from the edge of the bore.

According to the present invention, when two composite structures are joined, such as a ceramic sheet supporting a ceramic liner tile, opposed pairs of spring washers are compressed by the fastener. The surfaces where the washers contact the structures are covered with an abradable material (e.g., a cloth in binder).

According to one aspect of the present invention, the bearing assembly includes a stack of annular springs, each formed by tightly winding a flat helical spring in a circular pattern. These springs support the fastener in the journal bearing.

According to one aspect of the present invention, the bearing assembly includes a plurality of resilient, hollow, cylindrical springs that support the fastener in the journal bearing.

According to the present invention, the bearing assembly includes a wave spring extending around the interior of the seat, separating the fastener and the seat.

According to the present invention, the compressive load from a bolt is applied at a location radially away from form a bore (bolt hole) by the use of a washer with circumferential land. The land contacts the portion of the flange on the journal bearing containing the land that engages the structure's surface.

Other objects, benefits and features of the invention will be apparent from the following discussion of one or more embodiments.

BRIEF DESCRIPTION OF THE DRAWING

FIG. 4 is an exploded view of FIG. 2.

FIG. 5, a perspective, shows an insert containing a journal bearing and wave spring bearing for a fastener, according to the present invention.

FIG. 6 is a perspective showing two resilient, metal separators that are used to separate two composite panels that are held together according to the present invention.

BEST MODE FOR CARRYING OUT THE INVENTION

Figure 1:
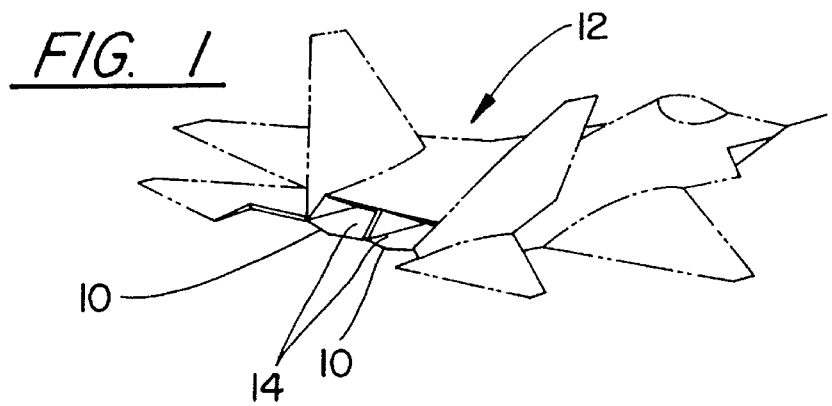
FIG. 1 is a simplified view a typical gas turbine powered (jet) aircraft in which a cooled, ceramic liner tile, shown in FIGS. 3 and 7, is used in the exhaust.
Figure 7:
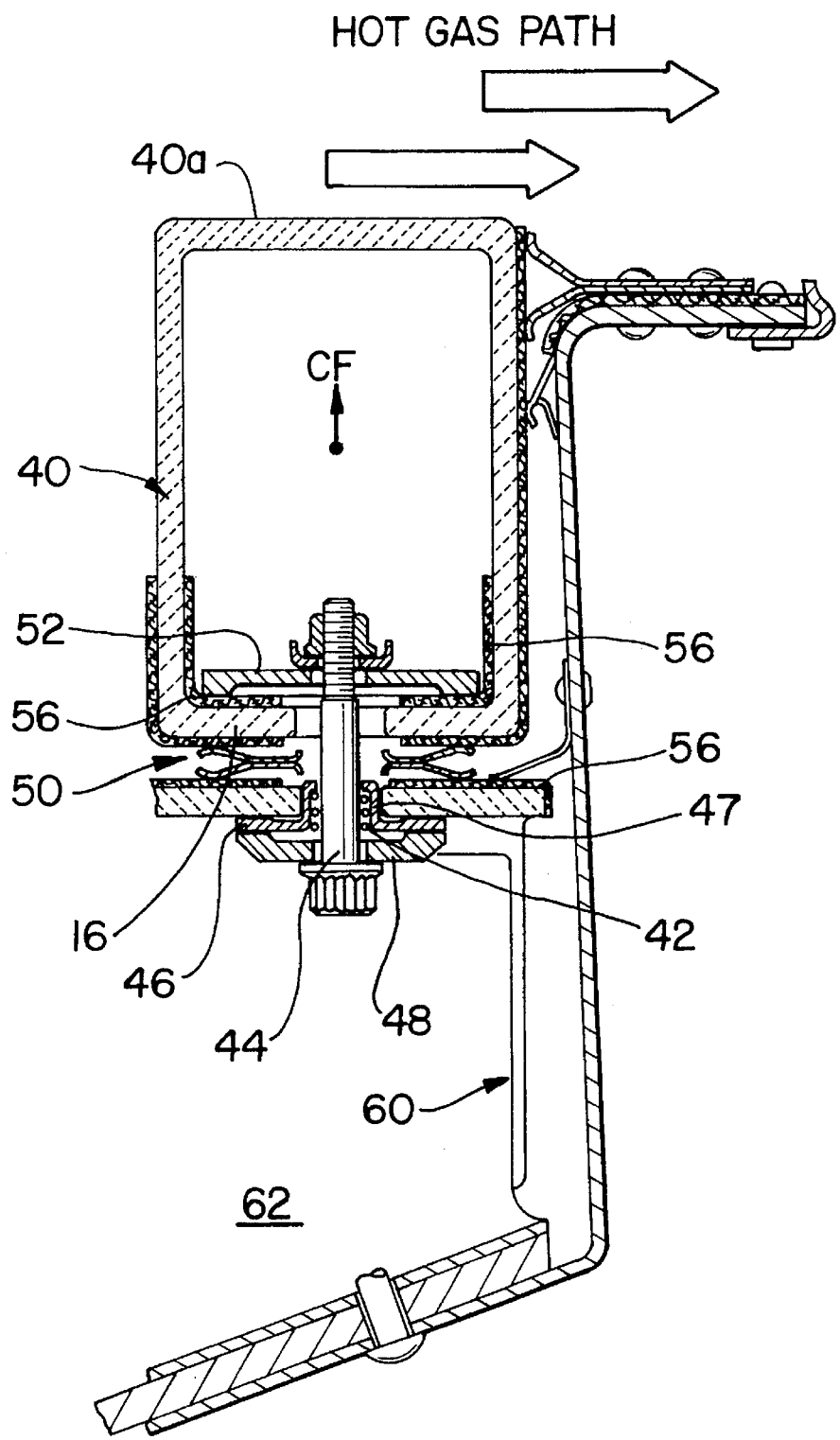
FIG. 7 is a perspective of an exhaust liner tile mounting arrangement that embodies the present invention.

In FIG. 1, the exhaust 10 of an aircraft 12 is lined with a ceramic composite liner 14, such as Nextel 440/Silica. For the purposes of discussion, the exhaust should be assumed to comprise of removable panels 16 that are sometimes fastened to each other, as shown in FIG. 2, or fastened to a hollow (for air cooling) tile 18, as shown in FIG. 3 and FIG. 7, to line the exhaust nozzle.

Figure 2:
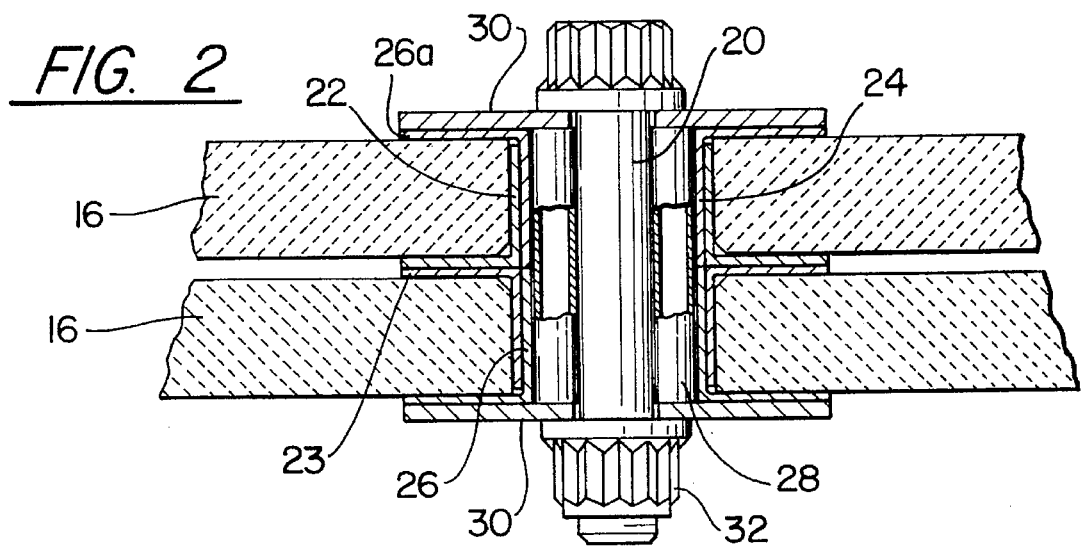
FIG. 2. is a section showing two composite panels that are fastened together according to the present invention.

Referring to FIG. 2, two sheets 16, which are also shown in FIG. 4, are held together by a bolt 20 that extends through a bore 22 in each panel. Edgings 23 actually define the bore. A journal bearing 26 is placed in the bore 22, and a plurality of hollow, thin-walled, springs 28 (bearing tubes) radially support the bolt 20. These bearing tubes 28 extend the length of the journal bearing 26. Being thin walled, they provide resilient radial (lateral) support to the bolt, accommodating thermal expansion and contraction at the bore 22. In addition, this resiliency allows the bolt to shift slightly in the journal bearing 26 as it is inserted. Washer 30 are placed between the bolt cap 31 and flanges 26a on the journal bearing 26. Another washer 30 are also placed in a similar manner beneath a nut 32. FIG. 5 demonstrates another embodiment of the invention describe in FIG. 2 and FIG. 4. There, a wave spring 34, made of pliant metal, is inserted between the bolt 20 and the journal bearing 26. The spring 34 may be tack-welded in the journal bearing 26 at locations 38, holding it in place.

Figure 3:
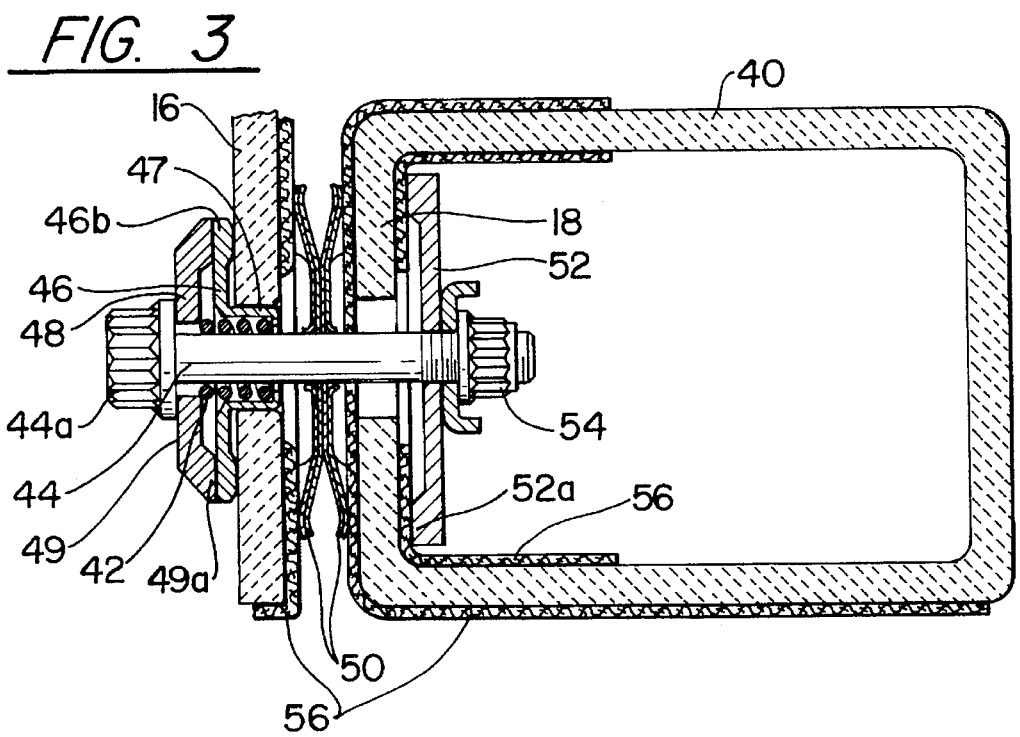
FIG. 3 is a section showing a composite (e.g. ceramic) sheet attached to a composite liner according to the present invention.

Turning now to FIG. 3, another embodiment of the invention is illustrated. Once again a composite (ceramic) sheet 16 is used, but in FIG. 3, it is attached to a four sided ceramic tile 40, hollow in the center to receive cooling air. The tile is used to line an exhaust nozzle 10a at the end of the exhaust 10. The nozzle 10a is not shown in detail. Many jet engines in use have lined nozzles, though not lined as prescribed by this invention. Annular springs 42 separate the bolt 44 from a journal bearing 46 that fits inside the bore 47 in the sheet 16. These springs 42, appearing as small, hollow, metal o-rings, are actually made of a tightly wound helical spring that is formed to be circular in plan and cross section (as shown). Such springs are made by Furon, Corp of Los Alimitos, Calif. They provide a similar type of support to that provided by the bearings 28 in FIG. 4; that is, they can be squeezed side to side (radial movement), which prevents stress buildup in the bore as the liner tile 40 heats, along with the bolt 44. The springs 42 also accommodate some axial movement by the bolt in the journal bearing. The journal bearing 46 contains a flange 46a with a circumferential land 46b that presses against the sheet 16 at some radial distance from the bore 47, which prevents stress concentration near the edge of the bore. Likewise a washer 49, between the bolt head 44a and the journal bearing flange 46a also contains a circumferential land 49a that engages only the land 46b. As a result, the compression force from the bolt is applied at some radial distance away from the bore.

FIG. 6 shows in greater detail the two somewhat concave spacers 50 that are located between sheet 16 and line tile 40. Due to the tabs 50a, which give the spacers a concave cross-section, they compress as the bolt 44 is tightened. Another washer 52 also has a circumferential flange 52a to apply the compression load a some radial distance away from the bore 47 as the nut 54 is tightened. To avoid damage to the composite's surface by the concave spacers 50 and the washer 52, the surface is covered with a fiber mat impregnated with a resilient material 56, e.g., Nextel brand fiber in RTV. The spacers 50, it will noticed, accommodate axial (the direction of the bolt axis) movement between the tile 40 and the sheet 16 and some movement normal to that direction (radially at the bolt 44).

Finally, FIG. 7 shows the tile 40 attached to an aircraft fuselage 60 using the technique shown in FIG. 3. The tile 40, hollow for cooling air flow, protects the fuselage 60 and interior area 62 from hot exhaust gas that flows by the tile surface 40a. One tile has been shown, but it should be understood that the nozzle 10a, for that matter other parts in the exhaust 10, would lined with a multitude of these tiles attached to one or more ceramic sheets 16 using the invention.

From the above explanation, it can be seen that the invention avoids applying loads to the sharp edges near the bore in the sheet, provides effective strain relief from thermal expansion in the bore and through the springs 28 and 30 and spacers 50 reduces the application of impact loads due to vibrations to the bore area for composite sheets and liner tiles, making the invention especially useful, but not exclusively, to gas turbine engine exhaust construction. With the benefit of this explanation of the invention, one of ordinary skill in the art may be able to make modifications, in whole or in part to a described embodiment of the invention without departing from the true scope and spirit of the invention.

We claim:

1. An exhaust liner for a gas turbine engine, characterized by:

a ceramic sheet in an exhaust section of said gas turbine engine;

a ceramic tile comprising at least four walls parallel to a common axis to define an interior with the tile;

an aperture in the ceramic sheet;

an opposed aperture in one of said walls of said ceramic tile, said apertures sharing a common axis;

a journal bearing in the aperture in the ceramic sheet;

an adjustable fastener extending through the journal and through the aperture in the tile for compressing together the ceramic sheet and said one wall together;

a plurality of springs supporting and surrounding the bolt in the journal bearing for resiliently allowing radial and axial movement when heated with respect to said common axis; and a pair of opposed resilient spacers between the ceramic sheet and the ceramic liner, the spacers containing aligned apertures, and the bolt extending through said aperture in the resilient spacers.

2. The exhaust liner described in claim 1, further characterized in that the springs comprise a stack of individual coiled annular helical springs.

3. An exhaust liner for a gas turbine engine, characterized by:

a ceramic sheet in an exhaust section of said gas turbine engine;

a ceramic tile comprising at least four walls each parallel to a common axis to define an interior with the tile;

an aperture in the ceramic sheet;

an opposed aperture in one of said walls of said ceramic tile, said apertures sharing a common axis;

a fastener extending through said apertures to attach the ceramic liner to the sheet;

means for resiliently allowing movement of the fastener radially and axially in the aperture in the sheet with respect to said common axis, said means constructed of metal; and means for resiliently accommodating movement between the sheet and the ceramic liner along said axis of the apertures, said means constructed of metal.

\* \* \* \* \*